Figure 1:
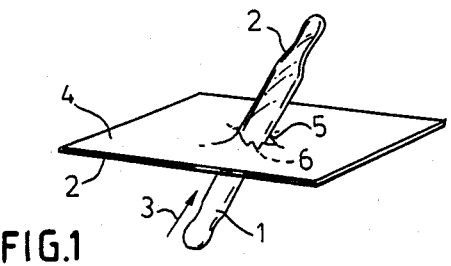

United States Patent [19]

Björnberg

[11] Patent Number: 4,652,145
[45] Date of Patent: Mar. 24, 1987

[54] FEVER THERMOMETER PROTECTOR

[75] Inventor: Sten G. Björnberg, Spånga, Sweden

[73] Assignee: Minitube Aktiebolag, Trangsviken, Sweden

[21] Appl. No.: 571,879

[22] PCT Filed: Apr. 13, 1983

[86] PCT No.: PCT/SE83/00136
§ 371 Date: Dec. 15, 1983
§ 102(e) Date: Dec. 15, 1983

[87] PCT Pub. No.: WO83/03671
PCT Pub. Date: Oct. 27, 1983

[30] Foreign Application Priority Data

Apr. 15, 1982 [SE] Sweden ................... 8202377

[51] Int. Cl.⁴ .................. G01K 5/00; B65D 75/26
[52] U.S. Cl. .................... 374/194; 374/158; 206/212; 206/306; 428/511
[58] Field of Search ........... 206/306, 212; 374/158, 374/194, 209; 428/35, 511, 530

[56] References Cited

U.S. PATENT DOCUMENTS

| | | | |
|---|---|---|---|
| 3,235,063 | 2/1966 | Jarund | 206/306 |
| 3,469,685 | 9/1969 | Baermann | 206/306 |
| 3,735,864 | 5/1973 | Eckhart | 206/489 |
| 3,809,230 | 5/1974 | Poncy | 206/306 |
| 3,833,115 | 9/1974 | Schapker | 374/158 |
| 3,904,806 | 9/1975 | Waggoner | 428/511 |
| 4,164,285 | 8/1979 | Dorman | 206/306 |

FOREIGN PATENT DOCUMENTS 1098790  1/1968  United Kingdom .

Primary Examiner—John E. Kittle
Assistant Examiner—James J. Seidleck
Attorney, Agent, or Firm—Kurt Kelman

[57] ABSTRACT

Fever thermometer protector consisting of an expansible Plastic Film to which a dimensionally stable backing means has been attached. The invention also comprises processes for manufacturing fever thermometer protectors.

3 Claims, 3 Drawing Figures

FEVER THERMOMETER PROTECTOR

The present invention relates to a protector for fever thermometers.

Especially in hospitals, the use of fever thermometers, both rectally and orally, involves significant risk for spreading infection. To avoid this, in addition to washing, a disposable protector of plastic film is used, usually heat-welded to a suitable sack-shape on an appropriate backing material. The manufacturing costs are high and the waste in materials is great. The weld is liable to irritate the patient during rectal insertion of the thermometer and the contact between the plastic film and the thermometer is poor.

It has now been discovered that an exceptionally suitable thermometer protector can be obtained by using a very expansible, thin plastic film, which has been combined with a suitable backing material of sufficient stability to make handling of the above mentioned thin plastic film possible when applying it to the thermometer. The arrangement thus comprises firstly a thin, expansible plastic film, and secondly an applied backing material of paper for example.

The thin, expansible plastic film can consist of one of many different known plastic materials, or mixtures or coextrusions thereof, e.g. EVA (ethylene Vinyl Acetate), EBA (ethylene Butyl Acrylate), PB (Poly Butylene), PVC (Poly Vinyl Chloride), LLDPE (Linear Low Density Poly Ethylene), SBS (Styrene Butadiene Styrene). The usable film materials must have an expansibility of at least 700%, a yield strength not exceeding 15 MPa, a rupture or breaking strength not less than 32 MPa, preferably about 40 MPa according to ISO Test Method R-1184, and a thickness between 0.005 and 0.1, preferably 0.010–0.040 mm.

The backing material can suitably consist of ordinary unbleached kraft paper with an area weight of 20–50 g per $m^2$. Other material such as metal foil or plastic film of suitable thickness can also be used.

The backing material can also be provided with holes, perforations or slots so that the point of the thermometer covered with the expansible plastic film can easily penetrate the paper.

It is also possible to provide the fever thermometer protector with a lubricant to facilitate rectal use of thermometers provided with the protector. The lubricant, such as petrolatum jelly, is applied between the expansible film and the backing material. In this case, the backing material can be provided with rupture indications to facilitate penetration of the fever thermometer through the backing material instead of holes or perforations through the backing material.

A great advantage in this case is that the outer surface of the protector can be protected from dirt before use and if desired can even be kept sterile. A film made by a process in which the material is subjected to high temperatures at least some time during the process, will usually without special steps be aseptic and protectors, according to the invention will be sterile without sterilization.

The fastening together of the thin plastic film and the backing material can be done by known methods used in lamination of paper and plastic in the packaging industry. For example, the plastic film and the backing material in rolled web form can be rolled off individually from separate rolls, with strings of adhesive being applied to one surface. The materials are then brought together and rolled up in a single roll. If the backing material is suitably coated, the webs can be joined together by heating the materials as they converge.

The new arrangement according to the invention thus consists of a combination of paper and expansible, thin plastic film which can be easily handled, held in the hand or handled in a simple mechanical device.

According to a preferred embodiment of the fever thermometer protector, the protective material, prior to use by application to a fever thermometer, consists of an expansible plastic film with properties according to the claims with a backing material applied to and covering one side. For use, the sensor end of the fever thermometer is pressed from the plastic film side through the backing material which ruptures or through a hole therein. The protective film will cover the fever thermometer and the backing material will be at the opposite end of the fever thermometer. The backing material can also consist of annular, U-shaped or otherwise shaped means.

The application of the protector to the thermomether can be effected by holding the fever thermometer in one hand and the protector in the other hand and pushing the end of the fever thermometer against the center of the plastic film, thus pushing it through the backing material which is possibly provided with perforations or a hole. The thermometer is pushed hard enough so that the thin plastic film is stretched and clings to the thermometer. After penetration of the backing material, the backing material can be removed, if desired.

Application can also be effected by setting the thermometer in a suitable holder with the sensor point upwards. The protector can then be pushed with both hands against the thermometer point with force sufficient to stretch the thin plastic film onto the thermometer.

After removal of the thermometer with protector, the protector is removed most suitably by pulling off the protector towards the thermometer point. The protective film is thus turned automatically inside-out, thereby enclosing any contaminants in the protector and keeping the thermometer clean.

Figure 2:
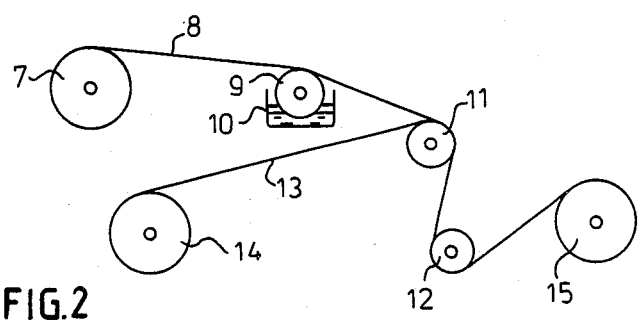
Figure 3:
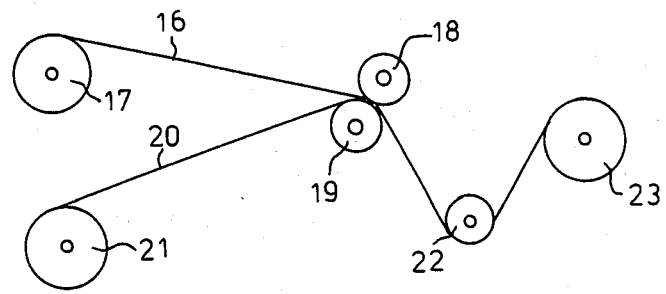

The invention is shown in FIGS. 1–3, of which FIG. 1 shows a protector according to the invention being applied to a fever thermometer.

FIG. 2 shows a device for manufacturing the protectors according to the invention and FIG. 3 shows an alternative arrangement for making the protector according to the invention.

FIG. 1 shows a protector into which a thermometer 1 is pushed against an expansible film 2 in the direction of the arrow 3. The expansible film is fixed to a sheet of paper 4, provided with tear indications 6 for a hole 5.

FIG. 2 shows schematically a process for manufacturing a fever thermometer protector according to FIG. 1, in which the sheet of paper 4 is fastened to the expansible film by means of adhesive. A paper web 8 of continuous backing material is rolled off a roller 7 and rolls over a glue roller 9 placed in a glue trough 10, and continues to two guide rollers 11 and 12 where the paper web is pressed together with a film web 13 with expansible film from a roll 14. The glued product is then rolled into a roll 15.

Finally, FIG. 3 shows an alternative arrangement for manufacturing the protector according to the invention. A paper web 16 with prestamped, continuous backing material is drawn from a roll 17 towards a pair of heated rollers 18 and 19, where the paper bew 16 is heatlaminated to an expansible film web 20 from the roll 21. The expansible film and the paper web joined thereto are then drawn via the guide roller 22 to a storage roll 23.

I claim:

1. In combination: a fever thermometer and a protector therefor, the protector consisting of an expansible plastic film detachably bonded to a backing material having low expansibility and elasticity, the backing material being paper with an area weight of 20–50 g/m² and defining tear indications, holes or perforations disposed for penetration by the point of the thermometer, and said plastic film having an expansibility of at least 700% and a thickness of between 0.005–0.1 mm, and the material of said plastic film being essentially non-elastic linear low density polyethylene having a breaking strength of at least 32 MPa and a yield point of below 15 MPa, whereby said film, when the point of the thermometer is pushed thereagainst, is stretched and extended over its yield point so that the film clings to the thermometer while the low expansibility and elasticity of the backing material permits the backing material to be penetrated by the pushed thermometer point and, when the backing material is detached from the film clinging to the thermometer and the film is removed from the thermometer, the film is pulled towards the point of the thermometer at the same time as it is automatically turned inside-out.

2. The combination protector according to claim 9, wherein the plastic film glued or welded to the paper.

3. A method of protecting a fever theremometer, which comprises the step of applying thereto a protector consisting of an expansible plastic film detachably bonded to a backing material having low expansibility and elasticity, said plastic film having an expansibility of at least 700% and a thickness of between 0.005–0.1 mm, and the material of said plastic film being essentially non-elastic linear low density polyethylene having a breaking strength of at least 32 MPa and a yield point of below 15 MPa, and the protector being applied to the thermometer by pushing the point thereof against the film whose expansibility and breaking strength causes the film to be stretched and extended over its yield point so that the film clings to the thermometer while the low expansability and elasticity of the backing material permits the backing material to be penetrated by the pushed thermometer point, and detaching the backing material from the film clinging to the thermometer.

* * * * *